United States Patent
Hiraki

(10) Patent No.: US 7,355,817 B2
(45) Date of Patent: Apr. 8, 2008

(54) HEAD SUSPENSION ASSEMBLY WITH FEMTO-SLIDER AND DISK DEVICE PROVIDED WITH THE SAME

(75) Inventor: Yoshiyuki Hiraki, Hachioji (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 316 days.

(21) Appl. No.: 11/107,891

(22) Filed: Apr. 18, 2005

(65) Prior Publication Data

US 2005/0243471 A1    Nov. 3, 2005

(30) Foreign Application Priority Data

Apr. 28, 2004  (JP)  ............................. 2004-134501

(51) Int. Cl.
*G11B 5/54*  (2006.01)
(52) U.S. Cl. ................. 360/244.9; 360/244.2
(58) Field of Classification Search ............. 360/244.9, 360/244.2, 234.3
See application file for complete search history.

(56) References Cited

U.S. PATENT DOCUMENTS

| | | | |
|---|---|---|---|
| 4,399,476 A | 8/1983 | King | |
| 5,245,872 A | 9/1993 | Cooper et al. | |
| 5,889,634 A * | 3/1999 | Chang et al. | 360/236.3 |
| 6,515,832 B1 * | 2/2003 | Girard | 360/245.3 |
| 6,542,338 B1 | 4/2003 | Kabasawa | |
| RE39,478 E * | 1/2007 | Hatch et al. | 360/245 |
| 2005/0057848 A1* | 3/2005 | Okasaka et al. | 360/97.01 |
| 2005/0207065 A1* | 9/2005 | Takagi | 360/235.8 |
| 2005/0275971 A1* | 12/2005 | Kuroki et al. | 360/244.2 |
| 2006/0203378 A1* | 9/2006 | Fu et al. | 360/98.07 |

FOREIGN PATENT DOCUMENTS

| | | |
|---|---|---|
| JP | 2000-40319 | 2/2000 |
| JP | 2001-283549 A | 10/2001 |
| JP | 2005-353188 A * | 12/2005 |

OTHER PUBLICATIONS

Australian Search Report dated Dec. 28, 2005 for Appln. No. 200502541-6.
J.P. Lazzari, et al., "A New Sub-Femto-Slider for Mass Production Planar Silicon Heads", IEEE Transaction on magnetics, vol. 34, No. 4, Jul. 1998.

* cited by examiner

*Primary Examiner*—Jefferson Evans
(74) *Attorney, Agent, or Firm*—Pillsbury Winthrop Shaw Pittman, LLP

(57) ABSTRACT

A head suspension assembly of a disk device comprises a head having a femto-slider, which is flied by an air current generated between the slider and a surface of the recording medium as the recording medium rotates, and a recording element which is provided on the slider and performs information processing for the recording medium, and a suspension which supports the head with respect to the recording medium and applies a head load bound for the surface of the recording medium to the head. The suspension has a thickness of less than 50 μm and the head load of 2.0 gf or more.

6 Claims, 2 Drawing Sheets

HEAD SUSPENSION ASSEMBLY WITH FEMTO-SLIDER AND DISK DEVICE PROVIDED WITH THE SAME

CROSS-REFERENCE TO RELATED APPLICATIONS

This application is based upon and claims the benefit of priority from prior Japanese Patent Application No. 2004-134501, filed Apr. 28, 2004, the entire contents of which are incorporated herein by reference.

BACKGROUND OF THE INVENTION

1. Field of the Invention

This invention relates to a head suspension assembly used in a disk device and the disk device provided with the same.

2. Description of the Related Art

In recent years, disk devices, such as magnetic disk devices, optical disk devices, etc., have been widely used as external recording devices of computers and image recording devices. A magnetic disk device as an example of a disk device comprises a magnetic disk, a spindle motor, a magnetic head, and a carriage assembly, which are arranged in a case. The spindle motor supports and rotates the disk. The magnetic head is used to write and read information to and from the disk. The carriage assembly supports the magnetic head for movement with respect to the magnetic disk. The carriage assembly comprises an arm attached to a suspension and a head portion provided on the slider. The head portion includes a reproducing element for reading and a recording element for writing.

The slider has a facing surface that faces a recording surface of the magnetic disk. The suspension applies a given head load bound for a magnetic recording layer of the disk to the slider. When the magnetic disk device is operating, an air current is generated between the rotating disk and the slider. Based on the principle of air-fluid lubrication, the facing surface of the slider is subjected to a force that causes the slider to fly above the recording surface of the disk. The slider is lifted with a fixed gap kept above the recording surface of the magnetic disk by balancing the flying force and the head load. As described in Jpn. Pat. Appln. KOKAI Publication No. 2001-283549, for example, the flying height, flying posture, and flying height under reduced pressure of the slider can be adjusted by properly shaping the irregularities of the facing surface that faces the disk.

Sliders have recently been made smaller and smaller. Slider sizes are standardized by International Disk Drive Equipment and Materials Association (IDEMA) standards. The sliders are named mini-sliders (100% sliders), micro-sliders (70% slider), nano-sliders (50% sliders), pico-sliders (30% sliders), and femto-sliders (20% sliders) in the descending order of size.

For example, the femto-sliders (0.85 mm by 0.7 mm by 0.23 mm) are smaller than the currently prevailing pico-sliders (1.25 mm by 1 mm by 0.3 mm). Magnetic heads are collectively manufactured by thin film processes. If the slider size is reduced, therefore, the yield of production of the magnetic heads can be increased with use of the same processes, so that the manufacturing costs can be lowered. Miniaturization of the sliders can improve the performance of the magnetic heads to follow up the irregularities of the magnetic disk surface. Further, the mass of the distal end portion of a head actuator is reduced, so that improvement of the seek speed can be expected. If the slider width is lessened, moreover, a recording region of the disk surface can be enlarged.

If the area of the facing surfaces of the sliders narrows with the miniaturization of the sliders, however, the following problems are expected to arise.

(1) The flying force of the magnetic heads is reduced, so that the head load cannot be supported, and the magnetic heads inevitably touch the disk surfaces.

(2) The head load cannot be supported, so that the loading posture of the magnetic heads collapses.

Conventionally, a measure to lessen the head load in proportion to the miniaturization of the sliders is used to solve these problems. According to recently predominant systems, the head load is also lessened if the sliders are downsized from pico-sliders to femto-sliders. If a femto-slider is used in a 2.5-inch type hard disk drive for mobile equipment, for example, the head load is believed to have its upper limit at 19.6 mN (2 gf).

Shock resistance (lift-off G or maximum leaving acceleration) Amax of the suspension can be given by $$A\max = F/(M+m), \quad (1)$$

where m is the mass of the slider. The shock resistance Amax depends on a suspension mass (equivalent mass in terms of dimple position) M and a head load F. Therefore, the shock resistance Amax is low if the head load F is low.

If the head load is lessened in proportion to the miniaturization of the slider, the suspension and the slider are liable to bounce off the magnetic disk when the disk device is shocked. When the bounced slider returns to its original position, it may possibly run against the disk, thereby damaging recording data. Thus, the reduction of the head load lowers the shock resistance performance of the disk device.

If the slider is reduced in size so that its mass lessens, m in the aforesaid equation (1) becomes smaller, resulting in an improvement in the shock resistance. However, a bouncing force that is generated when an impact is applied is greatly influenced by the equivalent mass of the suspension. In practice, therefore, the reduction of the slider mass is hardly conducive to the improvement in the shock resistance. Thus, the reduction of the head load that is involved in the miniaturization of the slider lowers the shock resistance, possibly degrading the reliability of the disk device.

BRIEF SUMMARY OF THE INVENTION

The accompanying drawings, which are incorporated in and constitute a part of the specification, illustrate embodiments of the invention, and together with the general description given above and the detailed description of the embodiments given below, serve to explain the principles of the invention.

According to an aspect of the invention, there is provided a head suspension assembly used for a disk-shaped recording medium, comprising: a head having a femto-slider, which is flied by an air current generated between the slider and a surface of the recording medium as the recording medium rotates, and a recording element which is provided on the slider and performs information processing for the recording medium; and a suspension which supports the head with respect to the recording medium and applies a head load bound for the surface of the recording medium to the head. The suspension has a thickness of less than 50 μm and the head load of 2.0 gf or more.

According to another aspect of the invention, there is provided a disk device comprising: a disk-shaped recording medium; a driving unit which supports and rotates the recording medium; a head having a femto-slider, which is flied by an air current generated between the slider and a surface of the recording medium as the recording medium rotates, and a recording element which is provided on the slider and performs information processing for the recording medium; and a suspension which supports the head with respect to the recording medium and applies a head load bound for the surface of the recording medium to the head. The suspension has a thickness of less than 50 μm and the head load of 2.0 gf or more.

DETAILED DESCRIPTION OF THE INVENTION

An embodiment in which a disk device according to this invention is applied to an HDD will now be described in detail with reference to the accompanying drawings.

Figure 1:
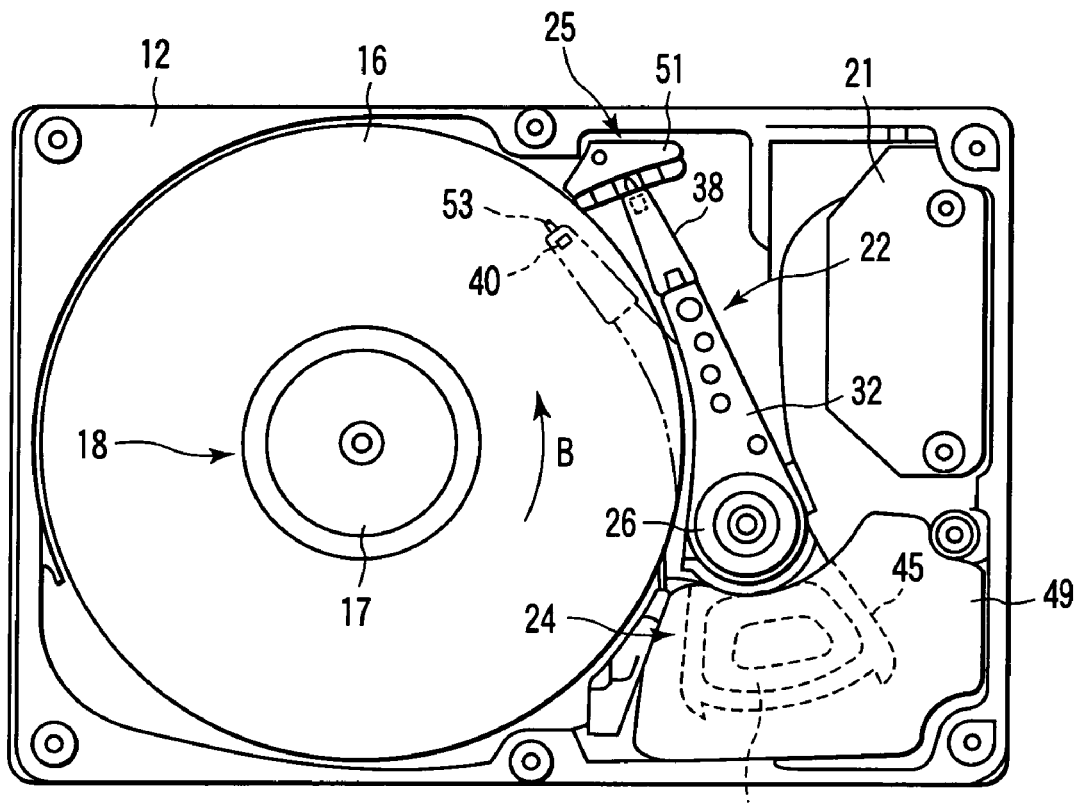
FIG. 1 is a plan view showing a hard disk drive (hereinafter referred to as an HDD) according to an embodiment of the invention.
Figure 2:
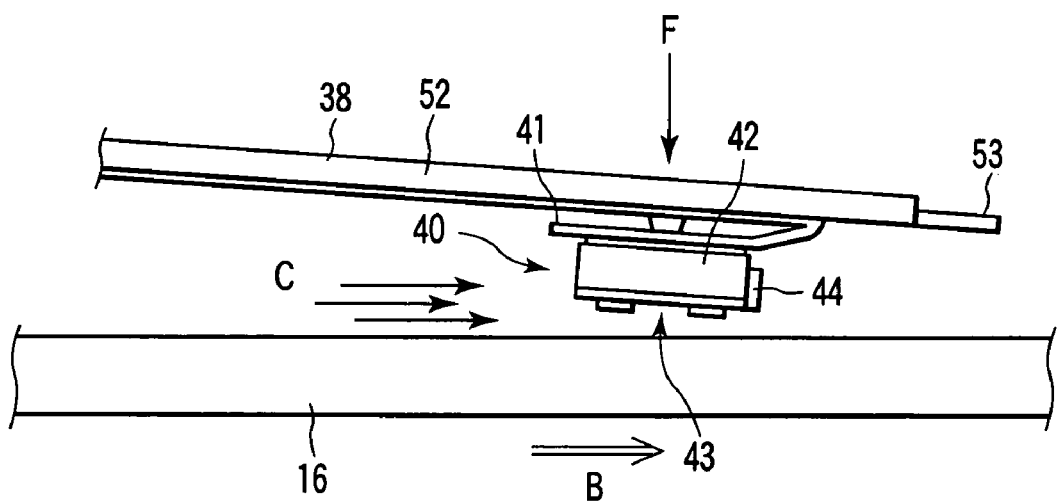
FIG. 2 is an enlarged side view showing a magnetic head portion of the HDD.
Figure 3:
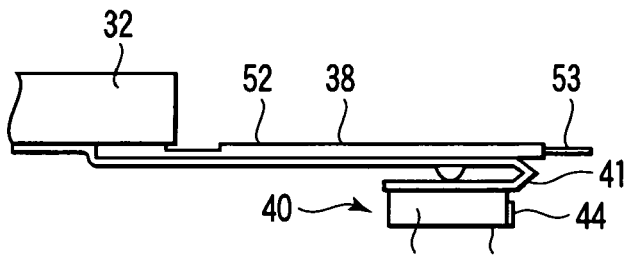
FIG. 3 is side view showing a head suspension assembly of the HDD.
Figure 5:
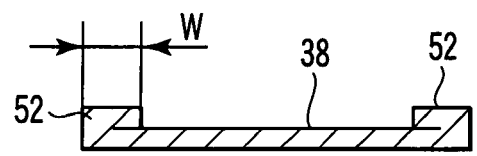
FIG. 5 is a sectional view of the head suspension assembly taken along line V-V of FIG. 4.
Figure 4:
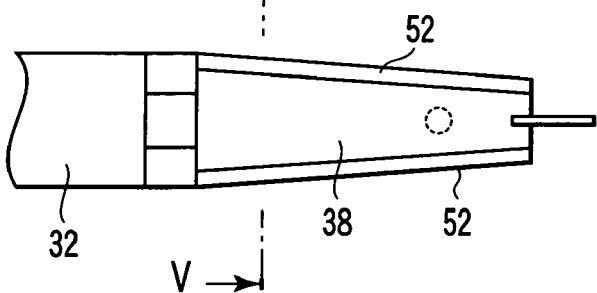
FIG. 4 is a plan view of the head suspension assembly.

As shown in FIG. 1, the HDD comprises a case 12 in the form of an open-topped rectangular box and a top cover (not shown) that is screwed to the case with screws and closes a top opening of the case.

The case 12 contains magnetic disks 16 for use as recording media, a spindle motor 18, magnetic heads 40, and a carriage assembly 22. The spindle motor 18 serves as a driving unit that supports and rotates the magnetic disks. The magnetic heads 40 are used to write and read information to and from the disks. The carriage assembly 22 supports the magnetic heads for movement with respect to the magnetic disks 16. Further, the case 12 contains a voice coil motor (VCM) 24, a ramp load mechanism 25, a FPC board unit 21, etc. The VCM 24 rotates and positions the carriage assembly. The ramp load mechanism 25 holds the magnetic heads in a shunt position off the magnetic disks when the heads are moved to the outermost peripheries of the disk. The FPC board unit 21 has a head IC and the like.

A printed circuit board (not shown) is screwed to the outer surface of a bottom wall of the case 12. It controls the operations of the spindle motor 18, VCM 24, and magnetic heads through the FPC board unit 21.

Each of the magnetic disks 16 is 2.5 inches in diameter, for example, and has magnetic recording layers on its upper and lower surfaces, individually. The magnetic disks 16 are fitted on a hub (not shown) of the spindle motor 18 and held on the hub by a clamp spring 17. When the spindle motor 18 is actuated, the magnetic disks 16 are integrally rotated at a given speed, e.g., at 4,200 rpm, in the direction of arrow B.

The carriage assembly 22 comprises a bearing portion 26 fixed on the bottom wall of the case 12 and arms 32 that extend from the bearing portion. The arms 32 are arranged parallel to the surfaces of the magnetic disks 16 and at predetermined spaces and extend in the same direction from the bearing portion 26. The carriage assembly 22 is provided with suspensions 38 in the form of an elastically deformable, elongate plate each. The magnetic heads 40 are supported on the respective distal end portions of the suspensions 38. The arms 32 and the suspensions 38 constitute head suspensions, and the head suspensions and the magnetic heads constitute a head suspension assembly.

As shown in FIG. 1, the carriage assembly 22 has a support frame 45 that extends from the bearing portion 26 in the direction opposite to the arms 32. The support frame 45 supports a voice coil 47 that constitutes a part of the VCM 24. The support frame 45 is molded integrally of a synthetic resin on the outer periphery of the voice coil 47. The voice coil 47 is situated between a pair of yokes 49 that are mounted on the case 12. The voice coil 47, along with the yokes 49 and a magnet (not shown) fixed on one of the yokes, constitutes the VCM 24. When the voice coil 47 is energized, the carriage assembly 22 rotates around the bearing portion 26, whereupon the magnetic heads 40 are moved to and positioned over a desired track.

The ramp load mechanism 25 comprises a ramp 51 and tabs 53. The ramp 51 is provided on the bottom wall of the case 12 and located outside the magnetic disks 16. The tabs 53 extend individually from the respective dens of the suspensions 38. When the carriage assembly 22 rotates to the shunt position outside the disks 16, the tabs 53 engage ramp surfaces on the ramp 51 and are then pulled up by the inclination of the ramp surfaces, whereupon the magnetic disks are unloaded.

The following is a detailed description of the head suspension assembly and the magnetic heads 40. As shown in FIGS. 2 to 5, each suspension 38 is formed of an elongate belt-shaped leaf spring with a thickness of less than 50 μm, e.g., of 35 μm. Its proximal end is fixed to the distal end of each corresponding arm 32 by spot welding or adhesive bonding and extends from the arm. The opposite side edge portions of each suspension 38 are turned back inward without failing to maintain a fixed width and form turndown portions 52, individually. A width W of each turndown portion 52 ranges from about 50 to 200 μm. If the turndown portions 52 are formed in this manner, the stiffness of each suspension 38 in its extending direction can be made about 40% or more higher than that of a suspension that has no turndown portions. Each suspension 38 may be formed integrally with its corresponding arm 32.

Each magnetic head 40 has a slider 42 substantially in the form of a rectangular prism and a recording/reproducing head portion 44 on an end face of the slider. It is fixed to a gimbals spring 41 on the distal end portion of it corresponding suspension 38. The magnetic head 40 is subjected to a head load F toward the surface of each magnetic disk 16 by the elasticity of the suspension 38. The head load F is set to 2.0 gf (19.6 mN) or more. If the magnetic disk 16 used has a diameter of 2.5 inches, the load F is set to 3.0 gf (29.4 mN) or more. If the magnetic disk has a diameter of 1.8 inches, the load F is set to 2.5 gf (24.5 mN) or more.

The slider 42 is formed as a femto-slider that is 0.85 mm long, 0.7 mm wide, and 0.23 mm thick. It has a rectangular disk facing surface 43 that faces the surface of the magnetic disk 16. The magnetic head 40 is formed as a flying head. The slider 42 is caused to fly by an air current C that is generated between the disk surface and the disk facing surface 43 as the disk 16 rotates. Thus, when the HDD is operating, the disk facing surface 43 of the slider 42 continually faces the disk surface across a gap. The direction of the air current C is coincident with a rotation direction B of the disk 16.

The head portion 44 of each magnetic head 40 is provided on the end face of the slider 42 that is situated on the downstream side of the air current C. The slider 42 flies in a tilted posture such that the head portion 44 is situated closest to the disk surface. The head portion 44 has recording and reproducing elements (not shown) for recording and reproducing information to and from the magnetic disk 16.

Figure 6:
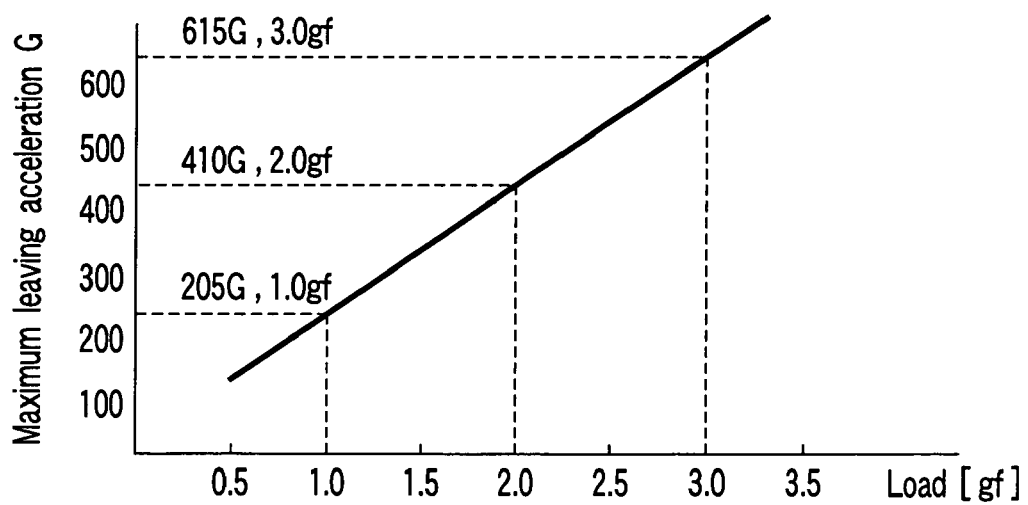
FIG. 6 is a diagram showing the relationship between the maximum leaving acceleration of the head suspension assembly and head load.

In the head suspension assembly constructed in this manner, the shock resistance (lift-off G or maximum leaving acceleration) Amax of the suspension 38 can be obtained from the aforementioned equation (1). It depends on the suspension mass (equivalent mass in terms of dimple position) M and the head load F. According to this head suspension assembly, the suspension mass M can be lessened by reducing the absolute mass of each suspension 38, which is supposed to be 35 μm thick, and by using a femto-slider as the slider 42. Further, the head load F is supposed to be 2.5 gf or more. Thus, high shock resistance can be obtained. As shown in FIG. 6, shock resistance G of 400 G or more and 600 G or more are obtained with use of head loads F of 2.0 gf and 3.0 gf, respectively.

Even if each suspension 38 is thinned, its stiffness can be increased by providing the turndown portions 52 on the side edge portions of the suspension. Accordingly, deflection of the suspension 38 can be reduced to improve its stability and durability. Each turndown portion 52 is turned back at 180 degrees and is intimately in contact with the suspension surface, so that the area of each side face of the suspension is not large. Therefore, each suspension 38 cannot be easily influenced by an air current that is generated as each magnetic disk rotates, so that it can be prevented from being swung by turbulence. Thus, the magnetic head 40 can be steadily supported by the suspension 38, so that the magnetic disk can enjoy high-accuracy, stable recording and reproduction.

According to the HDD and the head suspension assembly constructed in this manner, the magnetic heads can be miniaturized to improve the recording density and the shock resistance of the assembly. Thus, the HDD and the head suspension assembly obtained can enjoy outstanding shock resistance and high-accuracy recording and reproduction.

The present invention is not limited directly to the embodiment described above, and its components may be embodied in modified forms without departing from the scope or spirit of the invention. Further, various inventions may be made by suitably combining a plurality of components described in connection with the foregoing embodiment. For example, some of the components according to the foregoing embodiment may be omitted. Furthermore, components according to different embodiments may be combined as required.

For example, the number of magnetic disk(s) in the HDD is not limited to one or two and may be increased as required. This invention is not limited to magnetic disk devices but may be also applied to any other disk devices, such as optical disk devices.

What is claimed is:

1. A head suspension assembly used for a disk-shaped recording medium, comprising:
    a head having a femto-slider, which is flied by an air current generated between the slider and a surface of the recording medium as the recording medium rotates, and a recording element which is provided on the slider and performs information processing for the recording medium; and
    an elongate suspension which supports the head with respect to the recording medium and applies a head load bound for the surface of the recording medium to the head,
    the suspension having a thickness of less than 50 μm, the head load of 2.0 gf or more, and turndown portions formed by turning back opposite side edge portions of the suspension.

2. The head suspension assembly according to claim 1, wherein each of the turndown portions has a width in a range of 50 to 200 μm.

3. A disk device comprising:
    a disk-shaped recording medium;
    a driving unit which supports and rotates the recording medium;
    a head having a femto-slider, which is flied by an air current generated between the slider and a surface of the recording medium as the recording medium rotates, and a recording element which is provided on the slider and performs information processing for the recording medium; and
    a suspension which supports the head with respect to the recording medium and applies a head load bound for the surface of the recording medium to the head,
    the suspension having a thickness of less than 50 μm, the head load of 2.0 gf or more, and turndown portions formed by turning back opposite side edge portions of the suspension.

4. The disk device according to claim 3, wherein each of the turndown portions has a width in a range of 50 to 200 μm.

5. The disk device according to claim 3, wherein the recording medium has a diameter of 2.5 inches and the head load of 3.0 gf or more.

6. The disk device according to claim 3, wherein the recording medium has a diameter of 1.8 inches and the head load of 2.5 gf or more.

* * * * *